United States Patent [19]
Conrad

[11] Patent Number: 5,560,453
[45] Date of Patent: Oct. 1, 1996

[54] KEY FOR RAILROAD BRAKE SHOE ASSEMBLY

[75] Inventor: Keith D. Conrad, Aberdeen, N.C.

[73] Assignee: Westinghouse Air Brake Company, Wilmerding, Pa.

[21] Appl. No.: 398,310

[22] Filed: Mar. 1, 1995

[51] Int. Cl.$^6$ ................................................. F16D 65/04
[52] U.S. Cl. ........................................ 188/243; 188/250 G
[58] Field of Search ......................... 188/250 G, 234, 188/235, 242, 243, 244, 245

[56] References Cited

U.S. PATENT DOCUMENTS

| | | | |
|---|---|---|---|
| 1,465,975 | 8/1923 | Emery | 188/243 |
| 2,050,384 | 8/1936 | Schaefer | 188/243 |
| 2,094,273 | 9/1937 | Mack | 188/243 |
| 2,107,521 | 2/1938 | Busch | 188/243 |
| 3,015,372 | 1/1962 | Landell et al. | 188/243 |
| 4,466,513 | 8/1984 | Dedek | 188/243 |

FOREIGN PATENT DOCUMENTS

| | | | |
|---|---|---|---|
| 2357048 | 5/1975 | Germany | 188/243 |
| 1075815 | 7/1967 | United Kingdom | 188/243 |

*Primary Examiner*—Matthew C. Graham
*Attorney, Agent, or Firm*—Gary J. Falce

[57] ABSTRACT

A brake shoe key of the spring-type for affixing a brake shoe to a brake head, the key being formed from a flat strip of spring metal including a shank portion having a generally curvilinear profile and a head portion that is integral with the shank portion and is characterized by an open-loop configuration to provide a space in which a pry bar may be inserted, the open-loop configuration being formed by a stop leg that is outturned from one face of the shank and a pry leg that is spaced-apart from the stop leg on the opposite side thereof from the shank.

12 Claims, 2 Drawing Sheets

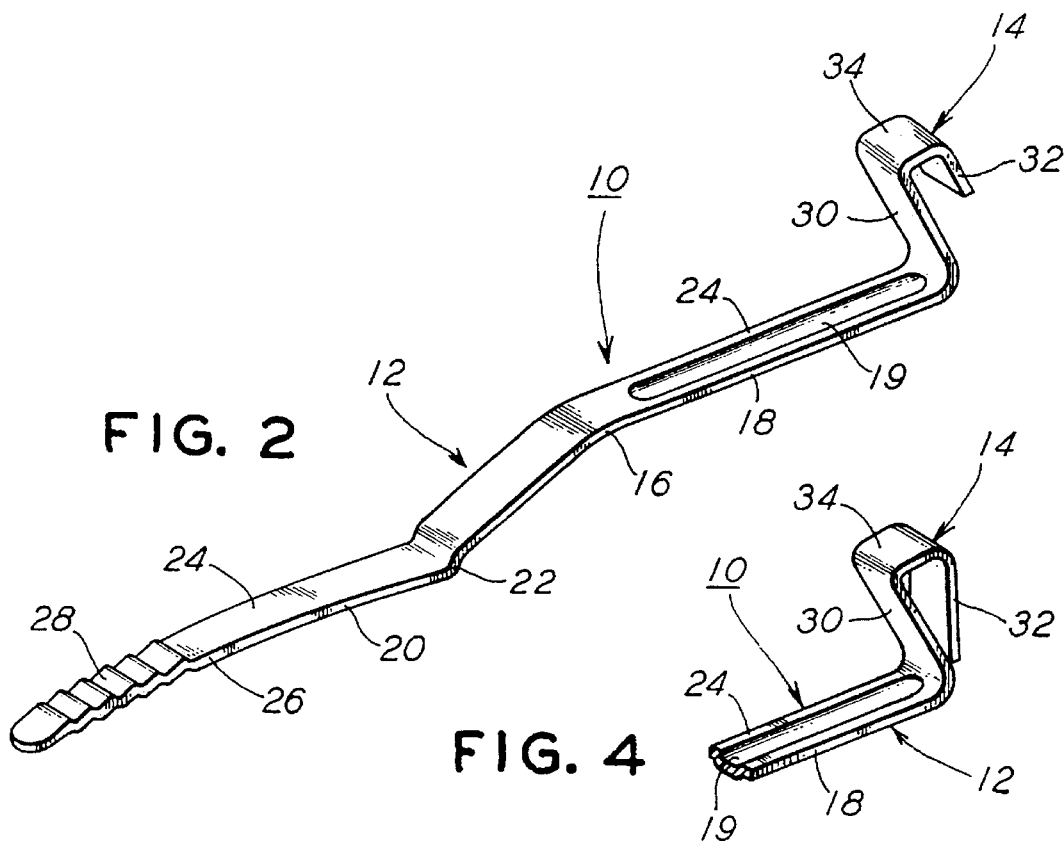
FIG. 2
FIG. 4
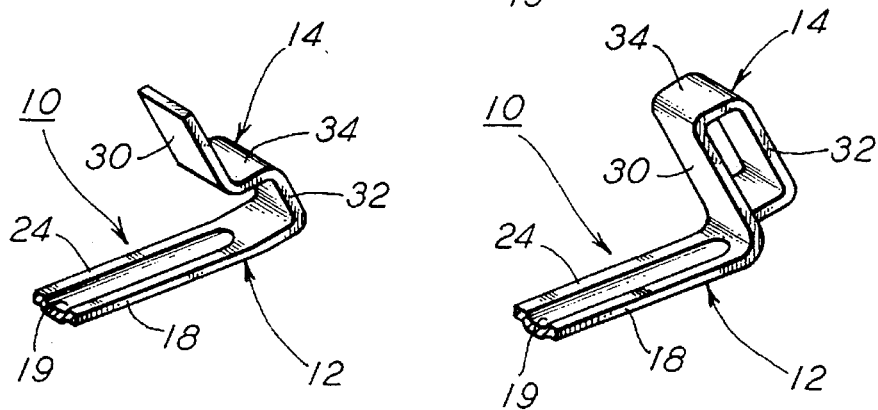
FIG. 6
FIG. 5

KEY FOR RAILROAD BRAKE SHOE ASSEMBLY

BACKGROUND OF THE INVENTION

The present invention relates to brake shoe assemblies for railroad cars and particularly to spring-type brake shoe locking keys that are adapted to removably affix a brake shoe to its brake head.

Shown in FIG. 1 is one design of a brake shoe locking key adopted by the Association of American Railroads (A.A.R.) as an alternate standard for the standard tapered key. Studies have shown the tapered key to be subject to accelerated wear, which results in loss in its ability to firmly affix the brake shoe to its backing plate. As is well-known, any looseness at the brake shoe/brake head interface results in undesirable brake head wear due to vibrations typically encountered in railroad service. The alternate standard brake shoe key shown in FIG. 1 is made of spring steel and firmly holds the brake shoe to the brake head under tension of the spring load created in the locking key as the key is deformed when driven into its locking position. This spring tension of the locking key takes up play between the brake head and shoe, to prevent the brake shoe backing plate from impacting the brake head in the face of such vibration as would otherwise cause such impact forces to rapidly wear the brake head and brake shoe key bridge.

A disadvantage of this spring-type key is the difficulty encountered in attempting to remove the key when the key has been driven fully into its locking position beyond the initial locking position shown in FIG. 1. A pry bar is typically employed by railroad personnel to force the key out of its locking position by wedging the pry bar between the head of the key and the brake head. In the fully driven locking position of the brake shoe key, however, the key head abuts the brake head, making it difficult to wedge a pry bar therebetween. For this reason, railroad personnel have been prone to drive the brake shoe key short of its locking position, in order to facilitate subsequent removal of the key.

While the foregoing practice assures that the head of the key is spaced sufficiently from the brake head to accommodate the insertion of a pry bar therebetween, failure to at least drive the key into its initial locking position results in the brake shoe being affixed to the brake head with less than sufficient force to prevent vibration from causing impact wear of the brake head and brake shoe key bridge.

This problem was addressed in another alternate standard brake shoe key in which the head of the key is modified in such a manner as to provide a stop with the brake head that establishes a space therebetween in which a pry bar may be inserted to facilitate removal of the key. This key stop is formed by bending the end of the key head in a downward direction so as to form a tab that overlays the key shank in spaced, parallel relationship therewith. This bent over tab is intended to abut the brake head so that the key head proper is spaced therefrom a distance sufficient to accommodate insertion of a pry bar when the key is driven to its full locking position. Due to different designed brake heads, however, the tab on the key head does not always find a stop until the key head abuts or nearly abuts the brake head. Consequently, the intended space in which a pry bar may be inserted between the key head and brake head either does not exist or is so small as to make it difficult to find an effective insertion point for the pry bar. Therefore, this key has not found general acceptance in the industry.

SUMMARY OF THE INVENTION

It is an object of the present invention to provide a spring-type brake shoe locking key that accommodates the use of a pry bar or the like tool to facilitate removal of the key in any driven position thereof.

In accordance with the foregoing objective there is provided a spring-type railroad brake shoe key formed from a strip of spring metal for affixing a brake shoe to a brake head by insertion of the key in a keyway of the brake head and through an aperture in the brake shoe key bridge, whereby the brake shoe is affixed to the brake head under spring tension. The brake shoe key comprises an elongated shank having a generally curvilinear profile terminating at one end in a head having a stop leg outturned from one face of the shank for engagement with the brake head in a locking position of the key, a pry leg that is spaced-apart from the stop leg in the direction of elongation of the shank on the side of the stop leg opposite the shank, and a bight portion that is interconnected between the stop leg and pry leg.

BRIEF DESCRIPTION OF THE DRAWINGS

These and other objects and advantages of the invention will become apparent from the following more detailed explanation when taken in conjunction with the drawings in which:

FIG. 2 is an axonometric view showing a spring-type brake shoe key having a novel head portion in accordance with one embodiment of the present invention;

FIGS. 4, 5 and 6 are partial axonometric views of a brake shoe key in accordance with the present invention showing alternate arrangements of the novel head portion thereof.

DESCRIPTION OF OPERATION

Figure 1:
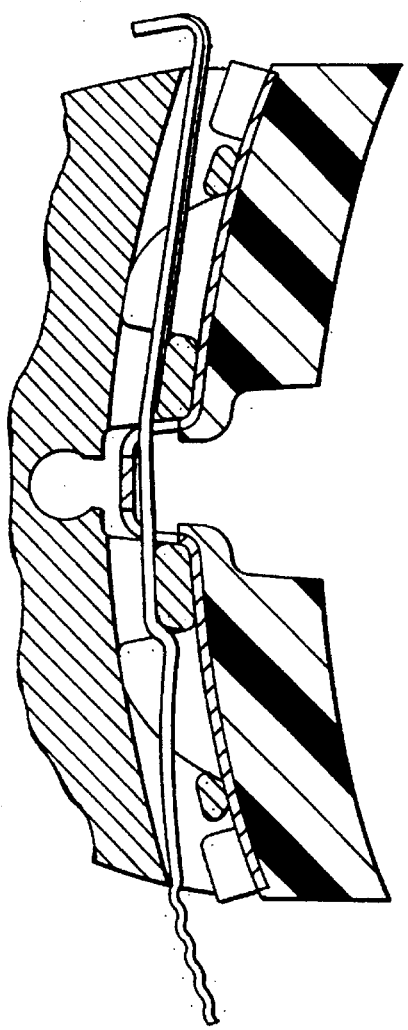
FIG. 1 is a sectional assembly view of a brake shoe affixed to a brake head by a spring-type brake shoe key known in the art.
Figure 3:
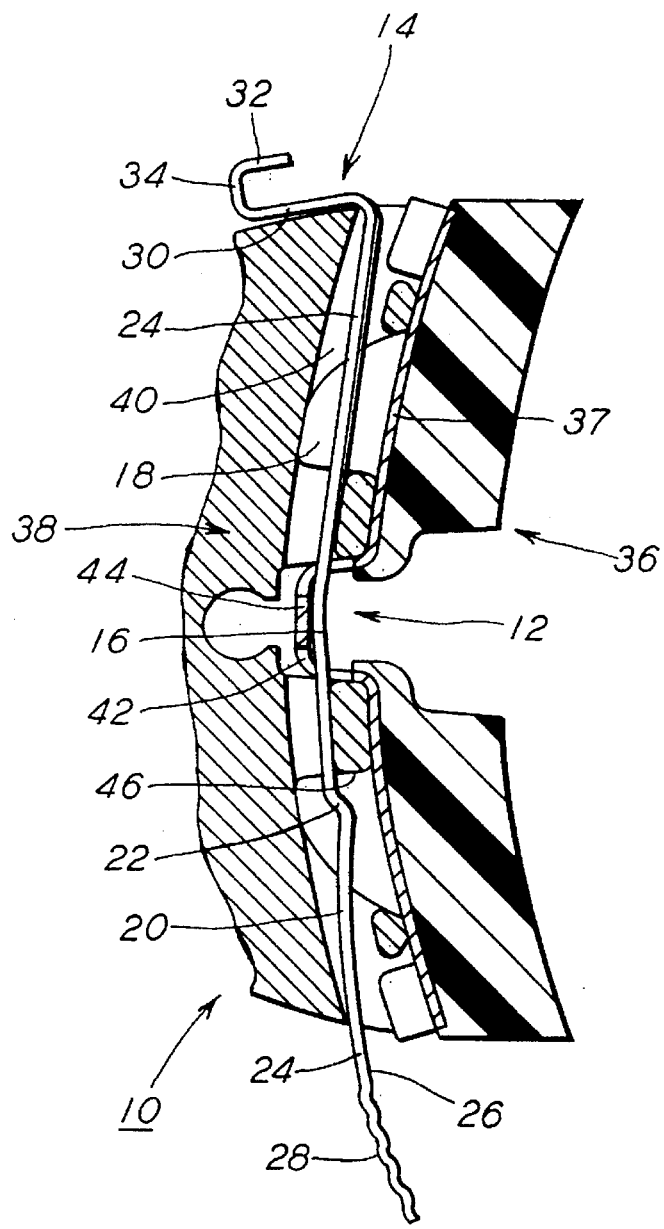
FIG. 3 is a sectional assembly view of a brake shoe affixed to a brake head by the brake shoe key of FIG. 2.

Referring now to FIGS. 2 and 3, there is shown one embodiment of a brake shoe key 10 in accordance with the present invention. This brake shoe key 10 consists of a shank 12 and a head 14 that are formed from a flat strip of spring metal having a generally curvilinear profile. Shank 12 includes an arcuate section 16 and a generally straight section 18 that is integral with head 14 at one end and with arcuate section 16 at its other end. This section 18 may be formed with a strengthening groove 19. The end of key 10 having head 14 is typically referred to as the top of the key. The bottom of key 10 is formed by another arcuate section 20 that is joined to arcuate section 16 via an offset or notch 22. The opposing faces 24 and 26 of arcuate section 20 are formed with corrugations 28.

Head 14 of brake shoe key 10 is formed in an open loop configuration and includes a stop leg 30 that is outturned from face 24 at an angle generally less than 90°. Spaced-apart from stop leg 30 is a pry leg 32 that is shorter than leg 30 and is generally parallel thereto. Leg 32 is interconnected to leg 30 by a bight portion 34, so as to be disposed on the side of stop leg 30 opposite shank 12.

When installing a brake shoe 36 to a brake head 38, brake shoe key 10 is manually positioned in a keyway 40 of brake head 38 and an aperature 42 of brake shoe key bridge 44 a distance sufficient to initially hold the brake shoe backing plate 37 in place against brake head 38. Hammer blows are then applied to stop leg 30 in the area exposed by the shorter leg 32 to forcibly drive key 10 to at least an initial locking position in which notch 22 rides over and engages a latch portion 46 of brake head 38. Notch 22 and latch portion 46 provide a locking detent to prevent undesired displacement of key 10 from its locking position. It will also be appreciated that in this locking position, key 10 is deformed in accordance with the space provided between key bridge 44 and brake head 38, thereby developing spring tension to maintain brake shoe 36 in tight engagement with brake head 38.

It will be understood that key 10 may be driven beyond this initial locking position to a further locking position, as shown in FIG. 3, without loss of any appreciable spring tension. In this further locking position, stop leg 30 abuts brake head 38, thereby preventing key 10 from being driven beyond this further locking position. As previously discussed, however, this makes insertion of a pry bar between stop leg 30 and brake head 38 difficult, resulting in the inappropriate practice of driving brake shoe keys short to assure sufficient space to insert a pry bar and thereby facilitate key removal. In accordance with the present invention, however, the open loop configuration of head 14 assures that a pry bar may now be easily inserted in the space formed between legs 30 and 32 of head 14, regardless of the degree of insertion of key 10, even when key 10 is fully driven to its further locking position in which stop leg 30 abuts brake head 38. In thus overcoming the difficulty of inserting a pry bar to dislodge brake shoe key 10, the problem heretofore associated with known spring type brake shoe keys is obviated by this invention.

In the other embodiments of the invention shown in FIGS. 4, 5 and 6, the brake shoe key 10 is similar to the FIGS. 2 and 3 embodiment of key 10, with the exception of the configuration of key head 14. In the FIG. 4 embodiment, head 14 is generally triangular in shape, stop leg 30 being connected to a pry leg 32 by a bight portion 34. Pry leg 32 is angularly disposed relative to stop leg 30, with the free end of leg 32 abutting stop leg 30 at the general location where leg 30 is outturned from shank 12.

In the embodiment of FIG. 5, head 14 is rectangular in shape, pry leg 32 having spaced-apart parallel relationship with stop leg 30. The free end of pry leg 32 is bent in the direction of shank 12, being disposed parallel to bight portion 34 and engageable with leg 30 at the location where leg 30 is outturned from shank 12.

In the embodiment of FIG. 6, head 14 comprises a pry leg 32 that is integral with shank 12, being outturned from face 24. A bight portion 34 interconnects pry leg 32 with a stop leg 30 that is spaced-apart from leg 32 in a direction back toward shank 12, such as to form a generally U-shaped opening between bight portion 34 and face 24 of shank 12 in which a pry bar may be inserted. Stop leg 30 is outturned from bight portion 34 in this arrangement.

I claim:

1. A brake shoe assembly for railroad cars comprising:
   a) a brake shoe member having a key bridge;
   b) a brake head having a keyway, an upper end and a lower end, said keyway having an opening in at least one of said upper and lower ends;
   c) a spring-type key received in said keyway and said key bridge, said key being inserted into said keyway to a locking position therein via said opening in said at least one of said upper and lower ends of said brake head whereby said brake shoe member is affixed to said brake head under spring tension of said key comprising:
      (i) an elongated shank formed from a strip of spring metal having a generally curvilinear profile including a convex surface and a generally parallel opposed concave surface, said concave surface confronting said brake shoe member when said key is inserted in said keyway and said key bridge;
      (ii) a head portion integral with said shank at one end thereof including:
         (a) a stop leg outturned from said convex surface of said shank such that a first surface of said stop leg is integral with said convex surface of said shank and abuts said one end of said brake head in the direction of insertion of said key to prevent said key from being inserted beyond said locking position; and
         (b) a pry leg spaced apart from said stop leg in the direction of elongation of said shank so as to be disposed adjacent a surface of said stop leg opposite said first surface thereof; and
         (c) a bight portion interconnected between said stop leg and said pry leg.

2. A brake shoe assembly as recited in claim 1, wherein said stop leg is integral with said shank.

3. A brake shoe assembly as recited in claim 1, wherein said pry leg is disposed in parallel relationship with said stop leg.

4. A brake shoe assembly as recited in claim 3, wherein said pry leg is shorter in length than said stop leg.

5. A brake shoe assembly as recited in claim 1, wherein said pry leg terminates at a free end, said free end abutting said stop leg at a location remote from said bight portion.

6. A brake shoe assembly as recited in claim 5, wherein said remote location is at the juncture where said stop leg is outturned from said convex surface of said shank.

7. A brake shoe assembly as recited in claim 5, wherein said pry leg is rectilinear between said bight portion and said free end to provide a triangular-shaped pry space between said stop leg, said pry leg and said bight portion.

8. A brake shoe assembly as recited in claim 5, wherein said pry leg includes a first segment integral with said bight portion and a second segment between said first segment and said free end, said first segment being parallel to said stop leg and said second segment being parallel to said bight portion to provide a rectangular-shaped space between said stop leg, said bight portion and said pry leg.

9. A brake shoe assembly as recited in claim 8, wherein said remote location is at the juncture where said stop leg is outturned from said convex surface of said shank.

10. A brake shoe assembly as recited in claim 3, wherein said pry leg is integral with said shank.

11. A brake shoe assembly as recited in claim 10, wherein said stop leg terminates in a free end that is spaced-apart from said bight portion in a direction away from said convex surface of said shank.

12. A brake shoe assembly as recited in claim 11, wherein said stop leg and said pry leg are on opposite sides of said bight portion.

* * * * *